United States Patent
Kuga et al.

(10) Patent No.: US 6,926,077 B2
(45) Date of Patent: Aug. 9, 2005

(54) FOLDABLE HEAT RADIATING SHEET

(75) Inventors: Takeshi Kuga, Ami-machi (JP);
Michiaki Inoue, Ami-machi (JP);
Shigeko Iijima, Ami-machi (JP)

(73) Assignee: Mitsubishi Chemical Functional Products, Inc., Tokyo (JP)

(*) Notice: Subject to any disclaimer, the term of this patent is extended or adjusted under 35 U.S.C. 154(b) by 0 days.

(21) Appl. No.: 10/470,059

(22) PCT Filed: Nov. 27, 2002

(86) PCT No.: PCT/JP02/12375
§ 371 (c)(1),
(2), (4) Date: Jul. 24, 2003

(87) PCT Pub. No.: WO03/046439
PCT Pub. Date: Jun. 5, 2003

(65) Prior Publication Data
US 2004/0055224 A1 Mar. 25, 2004

(30) Foreign Application Priority Data
Nov. 27, 2001 (JP) .................................. 2001-360672

(51) Int. Cl.[7] .............................. F24D 5/00; F24D 5/19
(52) U.S. Cl. ..................... 165/170; 165/172; 165/173; 165/174; 165/175; 165/58; 52/198; 52/220.1; 52/220.3; 237/70
(58) Field of Search ............................. 237/69, 67, 68, 237/70–79; 165/49, 53, 56, 171, 170, 172, 173–175, 177–183, 185, 168, 169, 55; 52/198–200, 220.1, 220.3

(56) References Cited

U.S. PATENT DOCUMENTS

| 615,377 | A | * | 12/1898 | Williams | 470/113 |
| 2,598,279 | A | * | 5/1952 | McKibbin | 165/56 |
| 3,037,746 | A | * | 6/1962 | Williams | 165/56 |

(Continued)

FOREIGN PATENT DOCUMENTS

| JP | 2-23299 | 3/1990 |
| JP | 10-339458 | 12/1998 |
| JP | 11-281070 | 10/1999 |
| JP | 2001-289447 | 10/2001 |

Primary Examiner—Jeanette Chapman
(74) Attorney, Agent, or Firm—Wenderoth, Lind & Ponack, L.L.P.

(57) ABSTRACT

A foldable heat radiation board includes a plurality of elongated and narrow plate-like members with fluid tube embedding grooves provided therein, and the plate-like members are combined with each other in a quadrangular plan configuration. Fluid tubes are embedded in the embedding grooves, and a heat radiation sheet is attached to the entire surface on the front surface side, while a back surface material is attached to the entire or partial surface on the back surface side. A plurality of contact portions in which the end portions of adjacent plate-like members contact each other are set as folding portions, and a fluid tube outlet opening portion in the end portion of one of the plate-like members and a fluid tube inlet opening portion in the end portion of the other of the plate-like members are provided so as not to oppose each other but to be shifted from each other, this portion being set as a fluid tube passage portion.

6 Claims, 7 Drawing Sheets

U.S. PATENT DOCUMENTS

| | | | | |
|---|---|---|---|---|
| 4,212,348 A | * | 7/1980 | Kobayashi | 165/49 |
| 4,250,674 A | * | 2/1981 | Feist | 52/220.3 |
| 4,627,203 A | * | 12/1986 | Presswalla et al. | 52/220.5 |
| 4,646,814 A | * | 3/1987 | Fennesz | 165/56 |
| 4,766,951 A | * | 8/1988 | Bergh | 165/56 |
| 5,454,428 A | * | 10/1995 | Pickard et al. | 165/49 |
| 5,871,151 A | * | 2/1999 | Fiedrich | 237/69 |
| 5,901,515 A | * | 5/1999 | Chen | 52/263 |
| 5,930,962 A | * | 8/1999 | Sokolean | 52/220.1 |
| 5,931,381 A | * | 8/1999 | Fiedrich | 237/69 |
| 5,957,378 A | * | 9/1999 | Fiedrich | 237/69 |
| 6,076,315 A | * | 6/2000 | Kondo | 52/220.1 |
| 6,079,170 A | * | 6/2000 | Slebos | 52/220.1 |
| 6,092,587 A | * | 7/2000 | Ingram | 165/56 |
| 6,182,903 B1 | * | 2/2001 | Fiedrich | 237/69 |
| 6,220,523 B1 | * | 4/2001 | Fiedrich | 237/69 |
| 6,270,016 B1 | * | 8/2001 | Fiedrich | 237/69 |
| 6,330,980 B1 | * | 12/2001 | Fiedrich | 237/69 |
| 6,430,882 B1 | * | 8/2002 | Feldpausch et al. | 52/220.7 |
| 6,533,185 B1 | * | 3/2003 | Muir | 237/69 |

* cited by examiner

FOLDABLE HEAT RADIATING SHEET

TECHNICAL FIELD

The present invention relates to a foldable heat radiation board, and in particular, to a foldable heat radiation board which is installed on the surface of a base material of a building, such as an ordinary housing, a condominium, a commercial building, or hotel. The heat radiation board is applicable to a wall surface, a ceiling board, a screen, or the like of a residential space, is capable of being folded, and is facilitated in packaging, storage, transportation, installation and other operations, whereby a flat-finished surface can be obtained after the completion of installation.

BACKGROUND ART

In order to achieve an improvement in the comfortability of houses in cold districts and the comfortability of houses in warm districts in the cold season, a floor heating technology for heating the inside of a house from the floor has conventionally been proposed and put into practical use. In the case of a detached house, there is adopted a technology with which, for instance, a heat radiation board (also called the "panel") for floor heating is incorporated between a sleeper and a floor board or on the upper surface (or on the upper side) of a backing plywood laid on the sleeper, and heating is performed using the heat radiation board. In the case of condominium such as an apartment house, there is adopted a method with which, for instance, a heat radiation board for floor heating is laid directly on the upper surface of a floor slab or on a backing plywood laid on the upper surface of the floor slab.

In JP 60-223922 A, JP 03-175216 A, JP 04-80596 A, JP 08-261485 A, and the like, for instance, there are proposed heat radiation boards for floor heating having a structure where grooves or spaces are formed in one surface of each plate-like member made of a soft foam or a hard foam, fluid tubes (heat carrier flexible tubes) are embedded in the grooves or the spaces, and the surfaces of the tubes are covered with a heat equalizer material such as an aluminum foil.

Generally, these heat radiation boards (panels) that have conventionally been known are obtained by forming grooves or spaces in elongated and narrow plate-shaped members along the lengthwise direction of the plate-like members and embedding fluid tubes, through which a fluid is to be allowed to flow, in the grooves or the spaces. In order to install a heat radiation board having this structure, there is generally adopted a technology with which a wide heat radiation board is assembled in advance at a place other than the installation site and then is brought to the installation site to be installed. With this conventional method, however, there occurs a problem that when the assembled wide heat radiation board is folded, the fluid tubes are buckled or are damaged by friction with the grooves provided in the plate-like members.

The buckling of the heat carrier tubes or the damage due to the friction with the grooves provided in the plate-like members frequently occurs in the end portions of the plate-like members through which the fluid tubes extend from one to the other of adjacent elongated and narrow plate-like members. By focusing attention on this fact, a method of solving the problem has been studied and there has been proposed a heat radiation board having a structure in which the plate-like members are made detachable (see JP 11-141899A, JP 11-294783A, etc.). As a result of further studies conducted, however, there has been found that although the aforementioned problem can be solved, the heat radiation board having the proposed structure still suffers from problems in that the manufacturing process is complicated because the number of plate-like members is increased, the installation is also complicated because it is required to conduct the installation while fitting the fluid tubes in the grooves provided in the plate-like members, and the surface of the heat radiation board after the installation is uneven although a flat surface is desired.

SUMMARY OF THE INVENTION

In view of the above-mentioned problems inherent in the prior art, the inventors of the present invention have conducted intensive studies and succeeded in completing the present invention. The present invention provides a heat radiation board, in which the number of construction elements (components) is reduced, the manufacturing process is not complicated, folding is possible, there hardly occur buckling of fluid tubes and damage due to friction with grooves formed in plate-like members at the time of packaging, storage, transportation, and installation, the installation at the installation site is facilitated, and a surface after the installation has a flat finish.

That is, according to the present invention, there is provided a foldable heat radiation board, in which a plurality of elongated and narrow plate-like members with fluid tube embedding grooves provided in one surface thereof are arranged in an approximately quadrangular plan configuration in which end portions thereof contact each other. Fluid tubes are embedded in the embedding grooves, and a heat radiation sheet is attached to an entire surface on a front surface side. A back surface material is attached to at least a part of a surface on a back surface side, and a plurality of folding portions are formed by a plurality of contact portions in which end portions of adjacent plate-like members contact with each other.

The foldable heat radiation board is characterized in that a fluid tube outlet opening portion in an end portion of one of adjacent plate-like members and a fluid tube inlet opening portion in an end portion of the other of the adjacent plate-like members are set at positions at which the opening portions do not oppose each other but are shifted from each other. A fluid tube arrangement cutout portion is provided between the opening portions on wall surfaces in the end portions of the adjacent plate-like members, and a fluid tube is allowed to extend from the outlet opening portion to the inlet opening portion through the fluid tube arrangement cutout portion. Either of the heat radiation sheet or the back surface material is made discontinuous along the plurality of folding portions.

DETAILED DESCRIPTION OF THE INVENTION

The present invention will now be described in detail.

A foldable heat radiation board (panel) according to the present invention is formed by combining a plurality of elongated and narrow plate-like members with each other so as to obtain a wide and elongated approximately quadrangular configuration after being installed. The heat radiation board is used to form a floor for floor heating, a wall surface, a ceiling board, a screen, or the like. Further, when a coolant is allowed to flow through fluid tubes of the heat radiation board instead of a heat carrier, the heat radiation board functions as a heat radiation board for cooling.

The material of the plate-like members is selected from among a wooden flooring material, a wooden board, a plywood, a particle board, a fiber board, a synthetic resin board, and the like. When the synthetic resin board is selected, it is suitable that the board is selected from among flat boards made of a hard foam resin having independent air bubbles and superior stiffness. Concrete examples of the hard foam resin material include a polystyrene foam, a mixture of a polystyrene foam and a polyethylene foam, a polypropylene foam, hard polyurethane, foam hard rubber, and the like. However the hard foam resin material is not limited to those of the examples. The expansion ratio of the synthesis resin board varies depending on the kind of resin used, but it is usually possible to select the expansion ratio in a range of 1.2 to 50 times, or preferably in a range of 2 to 30 times.

The minimum thickness of the plate-like members is equal to the diameter of the fluid tubes, while the maximum thickness thereof may be selected in a range of up to a size obtained by adding 25 mm to the diameter of the fluid tubes. It is not preferable that the thickness of the plate-like members exceeds the size obtained by adding 25 mm to the diameter of the fluid tubes because the plate-like members become too thick and the heat radiation board becomes bulky as a whole, causing difficulty in handling thereof It is usually possible to select the length of the plate-like members in a range of 60 to 400 cm in accordance with the installation site of the heat radiation board. When the heat radiation board is to be installed in a place having a large area, it is also possible to perform the installation by combining a plurality of heat radiation boards. It is usually possible to select the width of the plate-like members in a range of 10 to 100 cm. If the width exceeds 100 cm, there is impaired workability at the time of folding, packaging, storage, transportation, and the like. On the other hand, if the width is less than 10 cm, there are such drawbacks as follows: it becomes impossible to form U-shaped grooves for changing the extending directions of the fluid tubes; many plate-like members become necessary to obtain a certain width, and processing, such as manufacturing of the heat radiation board, folding after the manufacturing, and installation by unfolding the board, become complicated. As a result, it is not preferable that the width of the plate-like members is set outside of the range described above. When the plurality of plate-like members are arranged to obtain a heat radiation board whose plan configuration is approximately quadrangular, it is preferable that the plurality of plate-like members have the same thickness, length, width, and the like.

In one surface of the heat radiation board formed by the plurality of plate-like members, there are provided embedding grooves in which fluid tubes are to be embedded. It does not matter whether the embedding grooves are provided on the front surface side or the back surface side, but it is suitable that these grooves are provided on the front (upper) surface side from the viewpoint of heat radiation efficiency. It is preferable that the sectional configuration of these embedding grooves taken perpendicular to the extending direction thereof is U-shaped. It is also preferable that the opening width and depth of the embedding grooves, whose sectional configuration is U-shaped, are set approximately equal to the diameter of the fluid tubes. These embedding grooves are provided continuously by appropriately combining and connecting various grooves whose plan configurations are U-shaped, linear, and S-shaped (or inverse S-shaped).

Hereinafter, there will be described a heat radiation board having a structure where embedding grooves are provided on the front surface side of plate-like members. Embedding grooves having the U-shaped plan configuration are provided at one end or both ends in the lengthwise direction of the plate-like members, and change the extending directions of fluid tubes while maintaining their embedded state. Also, embedding grooves having the linear plan configuration are provided along the lengthwise direction of the plate-like members to establish connection between the U-shaped grooves in the end portions. Further, embedding grooves having the S-shaped (or inverse S-shaped) plan configuration are provided in portions in which some of the plurality of folding portions of the fluid tubes extend from one to the other of adjacent plate-like members. Here, it is preferable that the radius of the curvature of the U-shaped grooves and the S-shaped (inverse S-shaped) grooves is set at a minimum size with which the fluid tubes will never be buckled. It is also preferable that the embedding grooves are distributed so that heat is radiated uniformly from the entire surface of the heat radiation board or is radiated uniformly from a given portion in which heating is desired.

Figure 3:
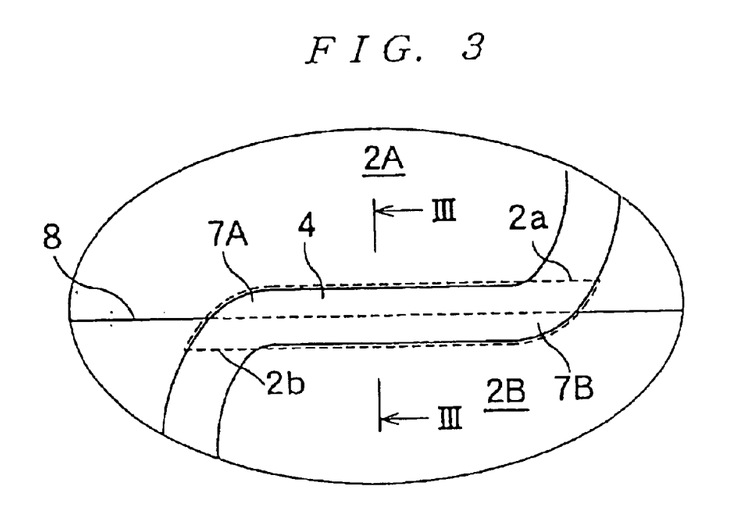
FIG. 3 is an enlarged schematic plan view of portion II (tube passage portion) shown in FIG. 2.
Figure 6:
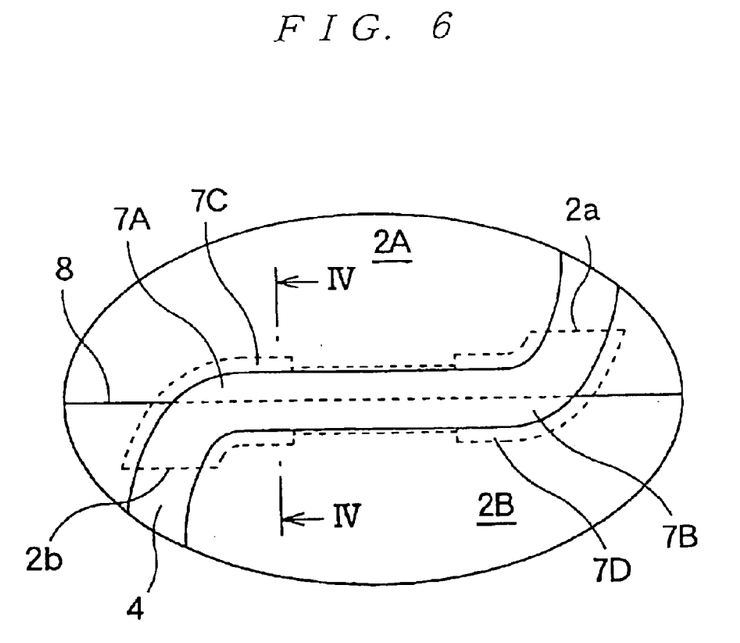
FIG. 6 is an enlarged schematic plan view of a state where a deep cutout portion is provided in the portion II (tube passage portion) shown in FIG. 2.

The heat radiation board according to the present invention has a construction where the position of a fluid tube outlet opening portion (fluid outlet portion) in the end portion of one of adjacent plate-like members and the position of a fluid tube inlet opening portion (fluid inlet portion) in the end portion of the other of the plate-like members are set so that these opening portions do not oppose each other but are shifted (offset) from each other (this will be describe later, see FIGS. 3 and 6). A fluid tube is arranged so as to extend through a portion between the outlet of one of the adjacent plate-like members and the inlet of the other thereof (this portion will be hereinafter sometimes referred to as the "tube passage portion"). Thus, when the heat radiation board is folded at each folding portion including the tube passage portion, the fluid tube is placed in a linear state and is exposed to the outside in this tube passage portion, which reduces the degree of twist occurring in the fluid tube and prevents the fluid tube from being bent at a right angle. As a result, buckling hardly occurs in the fluid tube. If the length by which the positions of the opening portions are shifted from each other, that is, the length of the tube passage portion is set too short, the degree of twist in the fluid tube is increased and the fluid tube is bent at an angle close to a right angle, so that the buckling easily occurs. On the other hand, if the length is too long, when a folding state is reset to a plane state, it is difficult to fit the fluid tube exposed at this portion in a fluid tube arrangement cutout portion, and neither of these cases is preferable. It is preferable that the length, by which the positions are shifted from each other is set as five to 20 times the diameter of the fluid tube.

The fluid tube arrangement cutout portion is provided between the opening portions described above (in the tube passage portion) on the wall surfaces in the end portions of the adjacent plate-like members. This fluid tube arrangement cutout portion is provided so as to be mirror-symmetric in the end (side) portions of the two plate-like members, thereby obtaining a structure where when the wall surfaces in the end portions of the two plate-like members are brought into contact with each other, an embedding groove having a U-shaped sectional configuration is formed (this will be described later, see FIGS. 4 and 5 and the like). Such a tube passage portion is provided, so that when the heat radiation board is folded at a contact portion in which the end portions of the plate-like members contact each other, the fluid tube passing through the tube passage portion is exposed and, when the folding state is reset and the heat radiation board is set in a plane state, it is possible to fit the fluid tube in the fluid tube arrangement cutout portion provided in the tube passage portion with ease. It does not matter whether the length of the fluid tube arrangement cutout portion is equal to the length of the tube passage portion or is equal to the entire length of the folding portion including the tube passage portion.

The location at which the folding portion including the fluid tube passage portion is provided for the heat radiation board, may be any of (1) only in the end portions (sides) in the widthwise direction of the plate-like members, (2) only in the end portions (sides) in the lengthwise direction of the plate-like members, and (3) in both of the end portions (sides) in the widthwise direction and the end portions in the lengthwise direction. The location (1) is adopted when a wide heat radiation board is obtained by combining the plurality of elongated and narrow plate-like members. On the other hand, the location (2) is adopted when an elongated heat radiation board is obtained by combining the plurality of elongated and narrow plate-like members, and the location (3) is adopted when a wide and elongated heat radiation board is obtained by combining the plurality of elongated and narrow plate-like members.

It is preferable that in the heat radiation board according to the present invention, a fluid tube retainer is provided at an appropriate position on the surface of each fluid tube. With this construction, when the folding state of the heat radiation board is reset to a plane state to be installed, it is possible to push a part of the fluid tube existing in the fluid tube passage portion into the fluid tube arrangement cutout portion, thereby preventing the fluid tube from protruding onto the surface of the heat radiation board from the fluid tube passage portion. The fluid tube retainer is attached at a position on the surface of the fluid tube corresponding to a portion in which a deep cutout portion is provided. The sectional configuration of the fluid tube retainer taken perpendicular to the lengthwise direction of the fluid tube is like a short C-shaped tube. It is preferable that the fluid tube retainer is made of a relatively hard material, such as cross-linked polyethylene, polybutene, polypropylene, or semi-hard polyvinyl chloride, and the thickness and length (width) of the fluid tube retainer are respectively selected in a range of 1.0 to 5 mm and in a range of 3 to 20 mm.

In order to attach the fluid tube retainer, a deep cutout portion that is deeper than the fluid tube arrangement cutout portion is provided so as to be adjacent to the inlet opening portion and the outlet opening portion of the fluid tube arrangement cutout portion. The sectional configuration of the deep cutout portion taken in the lengthwise direction is U-shaped, the depth thereof is set equal to or somewhat larger than a depth with which fitting is possible under a state where the fluid tube retainer is attached to the surface of the fluid tube, and the length (width) of the deep cutout portion is set equal to or somewhat larger than the length of the fluid tube retainer.

The fluid tubes arranged and embedded in the grooves (including the linear grooves, the U-shaped grooves, and the S-shaped (inverse S-shaped) grooves) achieve a function of allowing a heat carrier or a coolant to pass through inner spaces thereof and are required to excel in flexibility as well as mechanical strength, heat resistance, chemical resistance, and the like. Examples of tubes having such properties include a cross-linked polyethylene tube, a polybutene tube, a polypropylene tube, a soft polyvinyl chloride tube, a nylon tube, and these resin tubes in whose wall surfaces there are embedded metal wires. Of these, the cross-linked polyethylene tube and the polybutene tube are preferable. The outer diameter of the heat carrier tubes varies depending on the district in which a building is constructed, the kind of building, and the like, although it is possible to select the outer diameter in a range of 3 to 20 mm. Also, it is possible to select the thickness thereof in a range of 0.5 to 5 mm.

Examples of the media allowed to flow through the fluid tubes include water, ethylene glycol, propylene glycol, a gas, and the like, regardless of whether the media is used as a heat carrier or a coolant. The fluid tubes are connected to a fluid circulating apparatus provided with a fluid temperature adjusting apparatus through a fluid header. It is preferable that the fluid temperature adjusting apparatus is placed in the vicinity of the installation site of the heat radiation board, such as the underfloor, the outside, or the rooftop of a building.

With the heat radiation board according to the present invention, after the fluid tubes are embedded in the embedding grooves, a heat radiation sheet is attached to the entire surface on the front surface side, and a back surface material is attached to the entire or partial surface on the back surface side. The heat radiation sheet is attached to the entire surface on the front surface side of the heat radiation board, although the back surface material is attached to the entire or partial surface on the back surface side of the heat radiation board. In this process, either the heat radiation sheet or the back surface material is made discontinuous along the plurality of folding portions. In the present invention, the word "continuous" refers to a state where the sheet or the material is not cut at the folding portions, while the word "discontinuous" refers to a state where the sheet or the material is cut at the folding portions. When the heat radiation sheet on the front surface side of the heat radiation board is made continuous at the folding portions and the back surface material on the back surface side is made discontinuous at the folding portions, the heat radiation sheet connecting the heat radiation board functions as a hinge and there is obtained a structure (hereinafter referred to as the "valley-foldable structure") where the heat radiation board is capable of being folded in a valley shape. On the other hand, when the back surface material on the back surface side of the heat radiation board is made continuous at the folding portions and the heat radiation sheet on the front surface side is made discontinuous at the folding portions, the back surface material connecting the heat radiation board functions as a hinge and there is obtained a structure (hereinafter referred to as the "mountain-foldable structure") where the heat radiation board is capable of being folded in a mountain shape. Note that it is sufficient that the back surface material is attached so as to achieve the function of a hinge, which means that it is not required to attach the back surface material to the entire surface in the lengthwise direction of the folding portion, and the back surface material may be partially attached to the folding portion at constant intervals. After being attached to the entire surface, the heat radiation sheet or the back surface material may be made discontinuous by cutting along the folding portions using a knife or the like.

With the heat radiation board according to the present invention, when the folding portion including the tube passage portion is provided in both of the end portions in the widthwise direction and the end portions in the lengthwise direction like in the case of the location (3) described above, it is preferable that both of the heat radiation sheet and the back surface material are made discontinuous at some of the plurality of folding portions (this will be described later, see FIGS. 10 to 13). Here, it is sufficient that both of the heat radiation sheet and the back surface material are made discontinuous at some of the plurality of folding portions. The folding portions, in which both of the heat radiation sheet and the back surface material are made discontinuous, may be determined as appropriate in accordance with the number of plate-like members constituting the heat radiation board (this will be described later, see FIGS. 10 to 13). Even when the plurality of plate-like members are arranged to form two rows (or two columns), it is possible to perform folding smoothly by making both of the heat radiation sheet and the back surface material discontinuous at some of the plurality of folding portions.

When the heat radiation sheet attached to the entire surface on the front surface of the heat radiation board is made of a material with superior flexibility, this heat radiation sheet prevents the fluid tubes embedded in the embedding grooves from detaching from the embedding grooves and functions as a hinge at the folding portions, as described above. When the heat radiation sheet is made of a hard plate-like material as described above, this heat radiation sheet pushes the fluid tubes into the fluid tube arrangement cutout portions. Examples of the heat radiation sheet include an aluminum foil, a metal foil plate, a metal plate, a lamination body of an aluminum foil and a nonwoven fabric, a material obtained by evaporating a metal, such as aluminum, onto a plastic film, or a lamination member thereof On the other hand, examples of the back surface material include an aluminum foil, a plastic film, a non-woven fabric, a lamination body of an aluminum foil and a nonwoven fabric, and the like. Usually, it is preferable that the thickness of the heat radiation sheet is selected in a range of 0.5 to 3 mm in the case of a hard plate-like material and is selected in a range of 10 mm to 0.3 mm in the case of a material with superior flexibility.

When the heat radiation board according to the present invention has a structure where the fluid tube retainers are attached to the fluid tubes, it is preferable that the whole of the heat radiation sheet or a part thereof in the vicinity of each folding portion is made of a hard plate-like material. When such a hard plate-like material is used and the mountain-foldable structure is obtained, the hard plate-like member contacts the surface of the fluid tube retainer prior to the surface of the fluid tube and the fluid tube retainer is pushed into the deep cutout portion in the course of an operation where the folding state is reset to a plane state at the time of installation of the heat radiation board. In this process, the fluid tube is simultaneously pushed into the fluid tube arrangement cutout portion, so that it becomes possible to prevent the fluid tube from protruding from the fluid tube passage portion.

When the embedding grooves are provided on the back surface side of the plate-like members, it is preferable that the thickness of the plate-like members is made thin as much as possible and the heat radiation sheet attached to the back surface side is regarded as a back surface material. This back surface material has a function of preventing the fluid tubes from being detached from the embedding grooves and also has a function of reflecting heat to the front surface side of the plate-like members, so that it is preferable that the back surface material is attached to the entire surface on the back surface side. A technology of combining the plurality of plate-like members with each other, a technology of embedding fluid tubes, a technology of forming folding portions, and the like used in this case are the same as those used in the aforementioned case where the embedding grooves are provided on the front surface side of the plate-like members.

It is preferable that the foldable heat radiation board according to the present invention is manufactured in advance in a plant, a factory, or the like that is different from the installation site. The heat radiation board is produced to have a desired wide area by arranging the plurality of plate-like members so that the end portions thereof contact each other, and has a plane configuration that is approximately quadrangular. Continuous fluid tubes are embedded in the fluid tube embedding grooves provided on one surface, a heat radiation sheet is attached to the entire surface on the front surface side, a back surface material is attached to the entire or partial surface on the back surface side, and the heat radiation sheet and/or the back surface material are/is made discontinuous at the folding portions by cutting.

The heat radiation sheet and/or the back surface material in the folding portions are/is made discontinuous as described above. Therefore, the discontinuous surface side is opened using the continuous surface side as a hinge at the time of folding (this will be described later, see FIG. 8).

Next, there will be described a method of installing the foldable heat radiation board according to the present invention. After being manufactured at a place that is different from the installation site, the foldable heat radiation board is transported/transferred to the installation site in a building under a folded state. The board is unfolded to be installed at a predetermined position on the backing surface of a building floor. The building may be an already-existing one as well as a newly constructed one. Here, in the case of a concrete building, such as an apartment house, a commercial building, or a hotel, the backing surface refers to a slab surface or a backing floor plywood disposed thereon. On the other hand, in the case of a detached house, the backing surface refers to a backing floor plywood. The predetermined position may be the whole or a specific part of the floor of a room. When the area of the installation site is large, the plurality of heat radiation boards may be combined with each other. It is possible to fix the heat radiation board to the backing surface or an already-existing floor made of a backing floor plywood using screws or nails.

It is preferable that when the heat radiation board is installed, a decorative material is arranged on the heat radiation sheet. Examples of the decorative material include a plywood, a wooden board, a fiber board, a resin board, a particle board, a carpet, and the like, although the present invention is not limited to these examples. The decorative material is selected in accordance with the kind of material of the plate-like members. It does not matter whether the decorative material is formed by a single wide material or the plurality of thin and small material pieces combined with each other. It is possible to apply a coating to the surface of the decorative material or to print a wood-grain pattern or another pattern thereon. Usually, it is possible to select the thickness of the decorative material in a range of 1 mm to 15 mm. If the thickness is too thin, the functions described above cannot be attained. On the other hand, if the thickness is too thick, the heat transfer efficiency from the fluid tubes is lowered, and, therefore neither of these cases is preferable.

Even when the foldable heat radiation board according to the present invention is used as a wall surface material, a ceiling material, or the like, it is possible to execute construction work by following the aforementioned method of constructing the heating floor. When this foldable heat radiation board is used as a screen, a reinforcement board is attached to its back surface to thereby obtain a certain width with which there is obtained a leg portion that achieves a self-standing function, for instance. Also, if the foldable heat radiation board is used as a folding screen, hinges are attached thereto.

(Embodiments)

Specific embodiments of the present invention will now be described in detail with reference to the drawings. The following embodiments, however, should not be construed restrictively, and various modifications are possible without departing from the scope of the invention.

Figure 1:
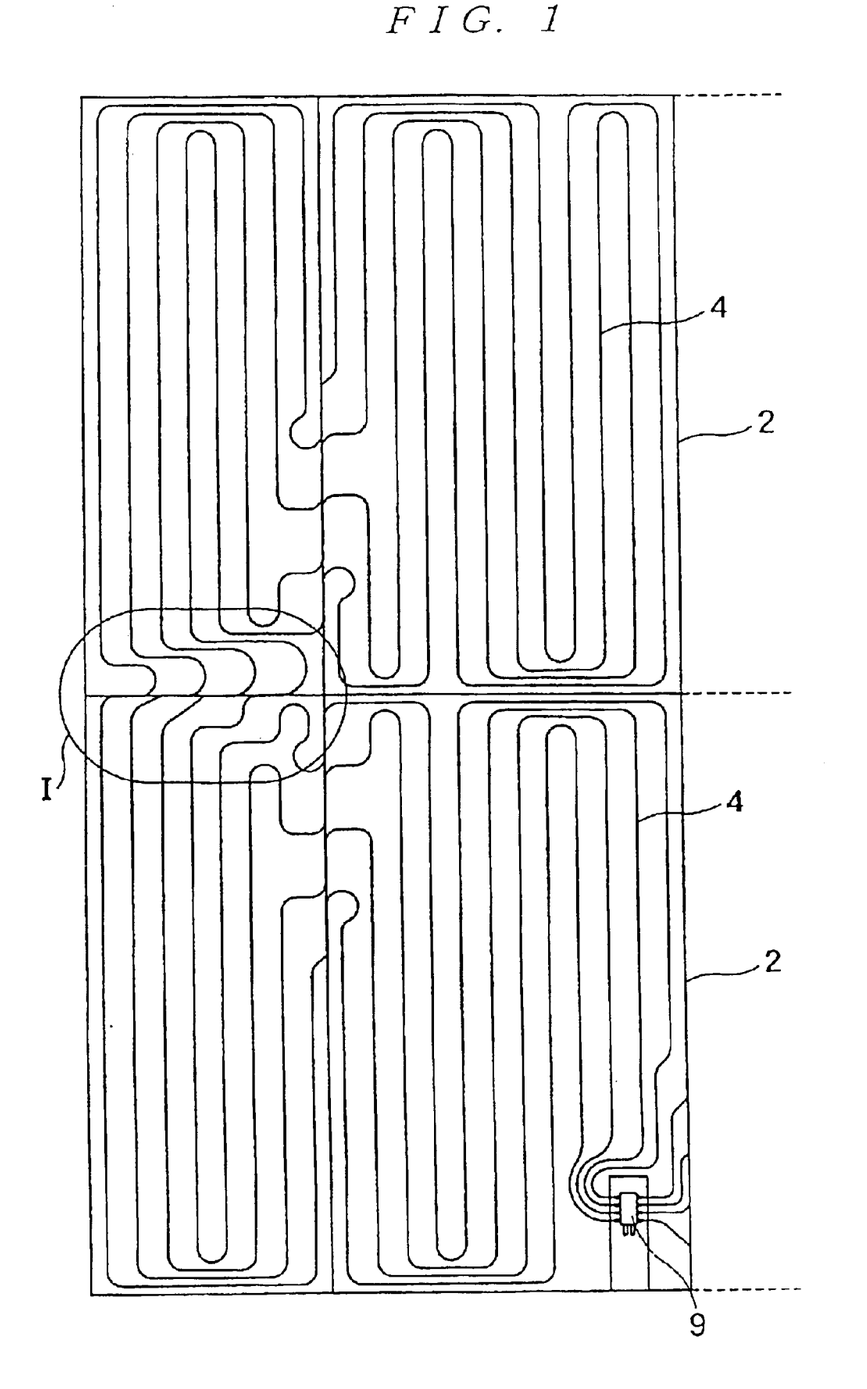
FIG. 1 is a partial schematic plan view of an example of a foldable heat radiation board according to the present invention.

A heat radiation board 1 is formed to have an approximately quadrangular configuration by combining a plurality of elongated and narrow plate-like members 2 with each other. In FIG. 1, there is illustrated an example where four plate-like members 2 are combined with each other, although it is possible to increase the number of combined plate-like members to six, eight, or ten, for instance. Fluid tube embedding grooves 3 are provided on the front surface side of the plate-like members 2. In more detail, U-shaped grooves that change the extending directions of fluid tubes are provided in the end portions of the plate-like members 2, liner grooves that connect the U-shaped grooves in the end portions are provided along the lengthwise direction of the plate-like members, and S-shaped (or inverse S-shaped) grooves are provided in portions (tube passage portions) through which the fluid tubes 4 pass from one to the other of the plate-like members.

Figure 4:
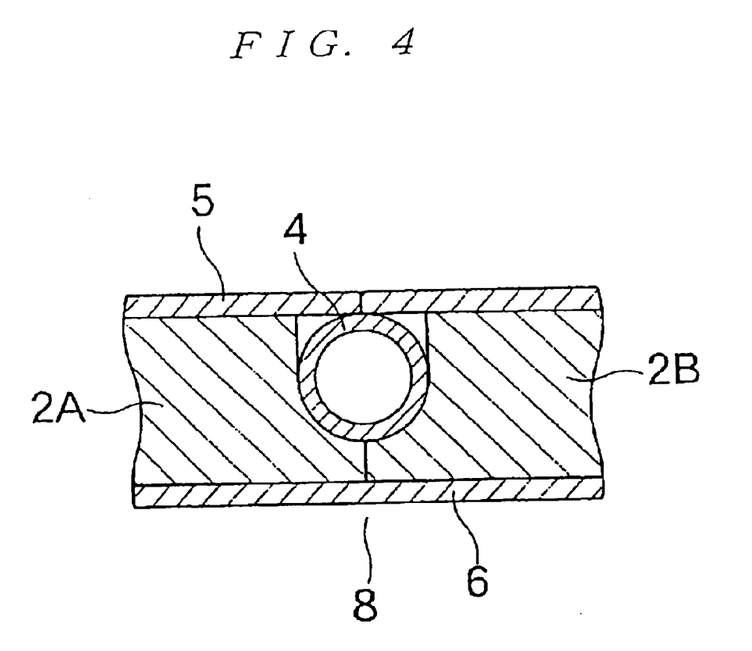
FIG. 4 is a schematic vertical side view taken along the line III—III of FIG. 3, with a back surface material of the heat radiation board functioning as a hinge.

In an example illustrated in FIG. 4, the heat radiation board 1 is constructed by plate-like members 2A and 2B that are arranged adjacent to each other, with a heat radiation sheet 5 being attached to the front surface side and a back surface material 6 being attached to the back surface side. The heat radiation sheet 5 is made discontinuous at a folding portion 8, while the back surface material 6 is made continuous at the folding portion 8 and functions as a hinge. A fluid tube outlet opening portion 2a in the end portion of the plate-like member 2A and a fluid tube inlet opening portion 2b in the end portion of the plate-like member 2B are provided at positions at which these opening portions 2a and 2b do not oppose each other but are shifted from each other. In the end portions of the plate-like members 2A and 2B, fluid tube arrangement cutout portions 7A and 7B are provided, so that a groove, whose vertical sectional configuration is U-shaped like the fluid tube embedding groove, is formed by both of the cutout portions under a state where the heat radiation board 1 is set in a plane state (see FIG. 4). When the heat radiation board 1 is folded at the folding portion 8, the heat radiation sheet 5 side is separated at the discontinuous portion and the fluid tube 4 is exposed while extending from the plate-like member 2A to the plate-like member 2B through the tube passage portion between the opening portion 2a and the opening portion 2b. Here, the folding manner in this example corresponds to the mountain folding described above.

Figure 5:
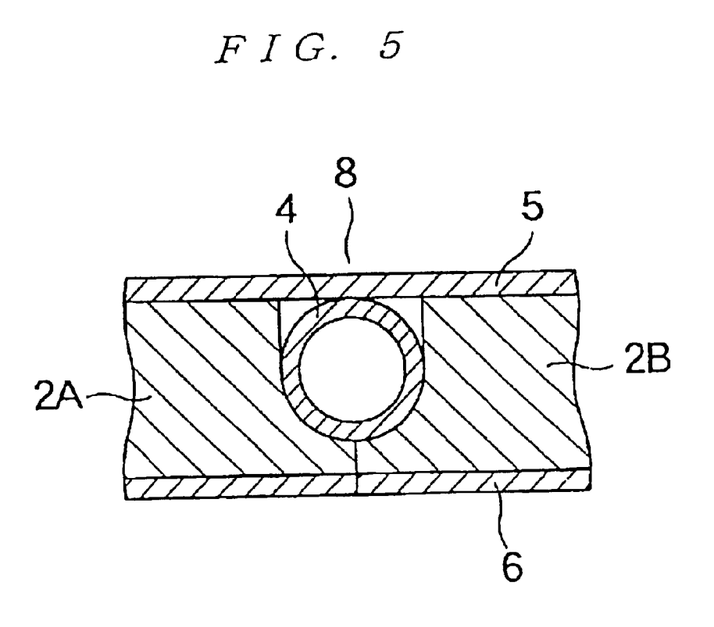
FIG. 5 is a schematic vertical side view corresponding to FIG. 4, with a heat radiation sheet of the heat radiation board functioning as a hinge.

In an example illustrated in FIG. 5, the heat radiation board 1 is constructed by plate-like members 2A and 2B that are arranged adjacent to each other. The heat radiation sheet 5 is made continuous at the folding portion 8 and functions as a hinge, while the back surface material 6 is made discontinuous at the folding portion 8. When the heat radiation board 1 is folded at the folding portion 8, the back surface material 6 made discontinuous is separated at the discontinuous portion and the fluid tube 4 is exposed while extending from one plate-like member to the other plate-like member through the tube passage portion between the opening portion 2a and the opening portion 2b. Here, the folding manner in this example corresponds to the valley folding described above.

Figure 2:
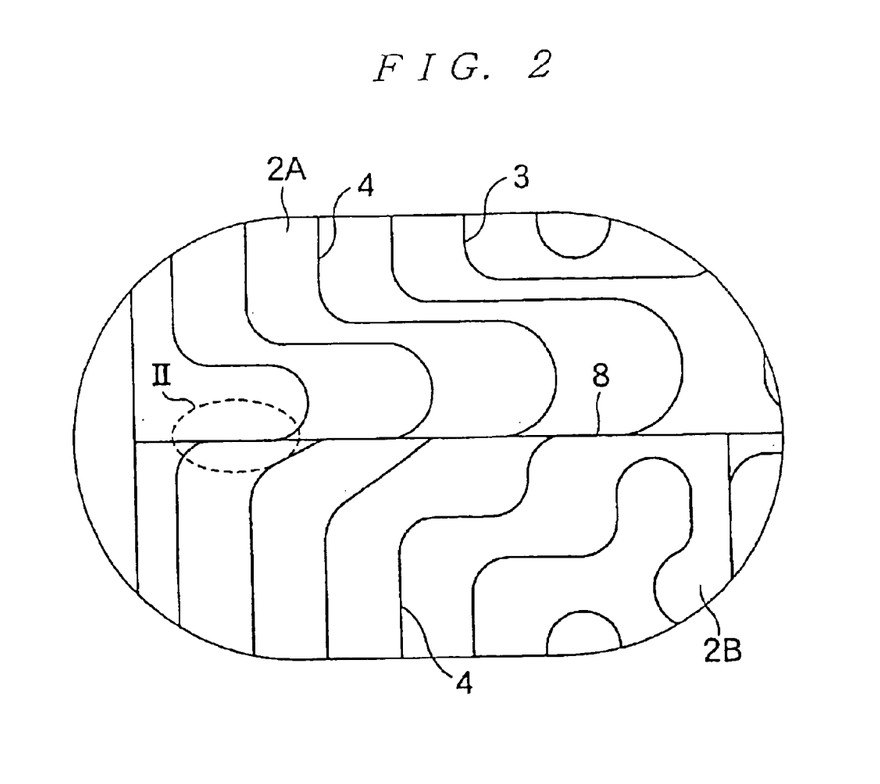
FIG. 2 is an enlarged schematic plan view of portion I shown in FIG. 1.
Figure 7:
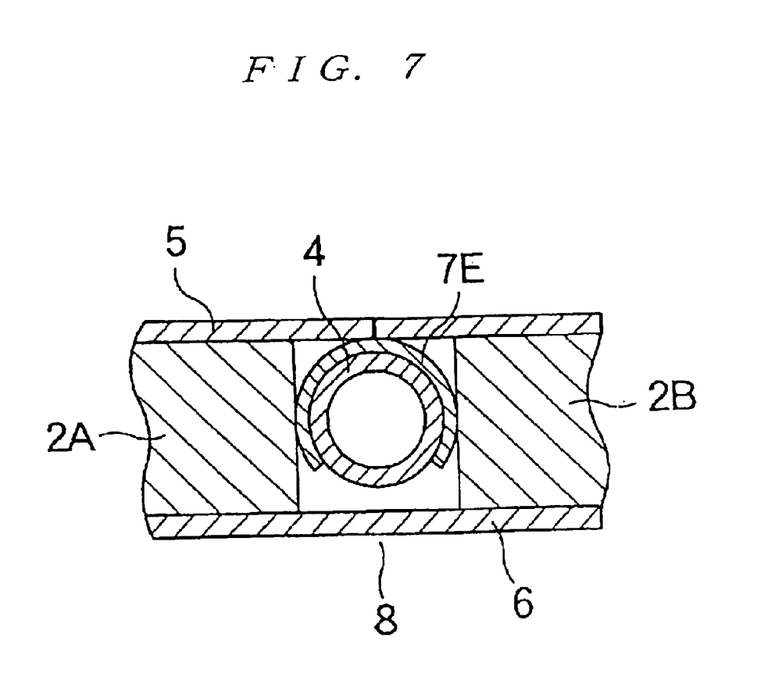
FIG. 7 is a schematic vertical side view taken along the line IV—IV of FIG. 6, with the back surface material of the heat radiation board functioning as a hinge.
Figure 8:
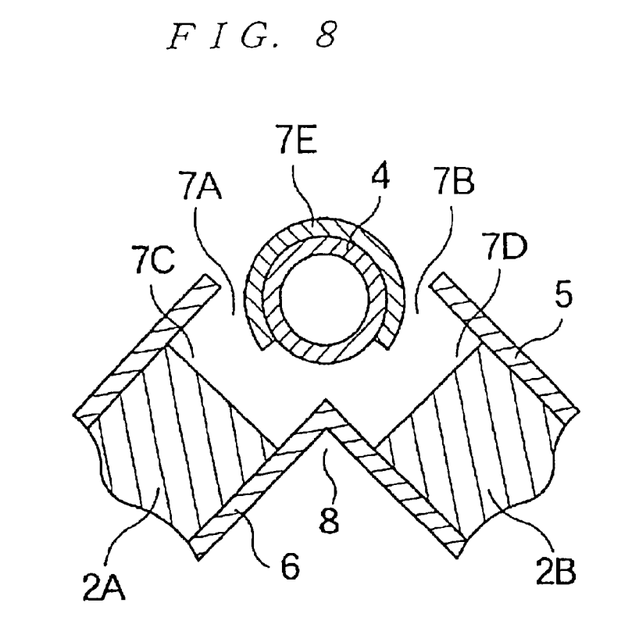
FIG. 8 is a schematic vertical side view of a state where the heat radiation board is in the course of being folded using the back surface material as a hinge.
Figure 9:
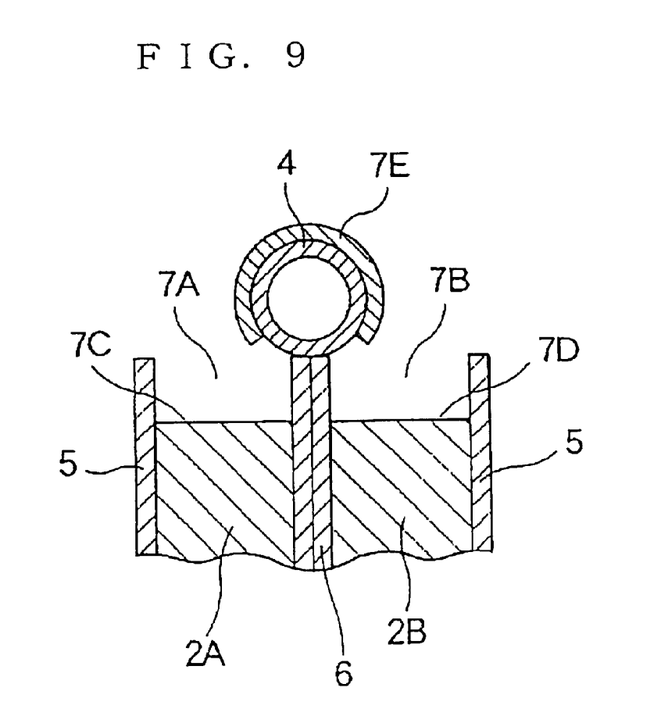
FIG. 9 is a schematic vertical side view of a state where the folding from the state in FIG. 8 is finished.
Figure 10:
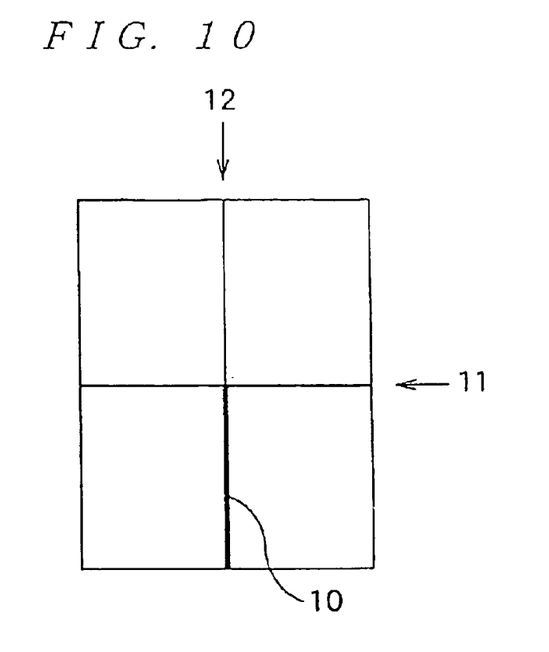
FIG. 10 is a schematic plan view of an example of a foldable heat radiation board including four plate-like members.
Figure 11:
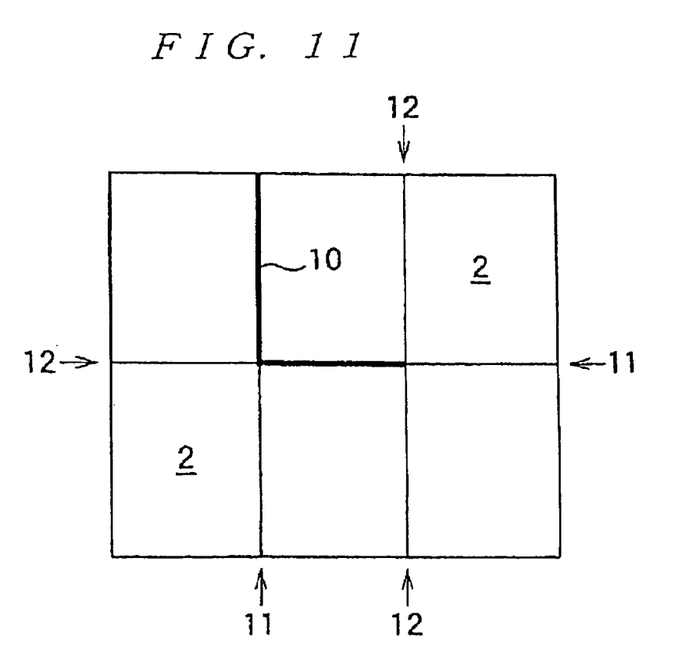
FIG. 11 is a schematic plan view of an example of a foldable heat radiation board including six plate-like members.
Figure 12:
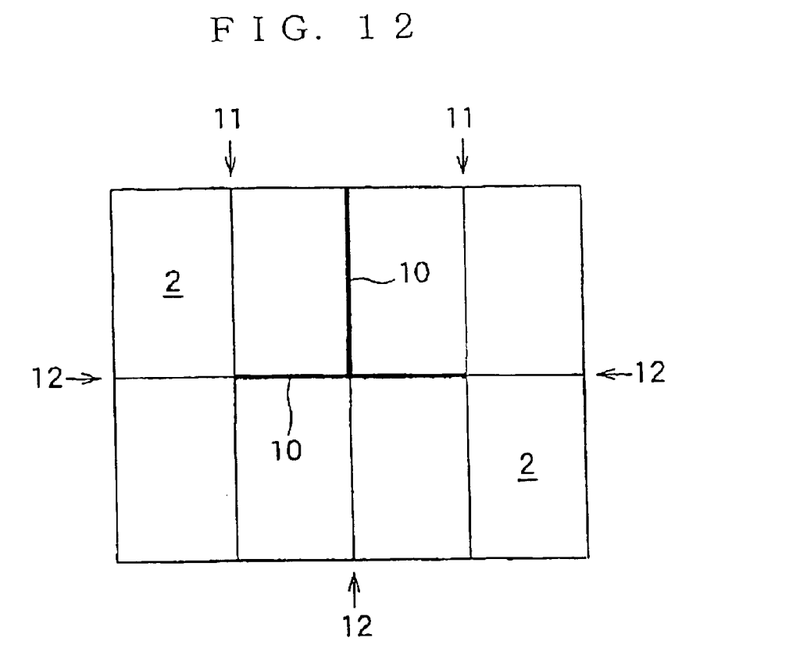
FIG. 12 is a schematic plan view of an example of a foldable heat radiation board including eight plate-like members.
Figure 13:
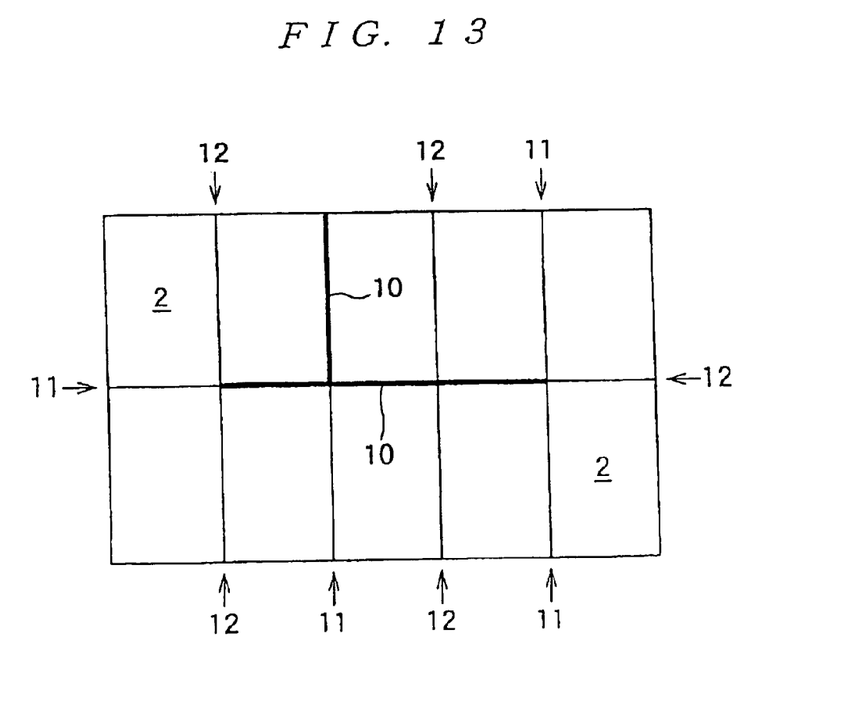
FIG. 13 is a schematic plan view of an example of a foldable heat radiation board including ten plate-like members.

FIG. 6 is an enlarged schematic plan view under a state where deep cutout portions 7C and 7D are provided in the portion II (tube passage portion) in FIG. 2. FIG. 7 is a schematic vertical side view taken along the line IV—IV of FIG. 6, with the back surface material of the heat radiation board functioning as a hinge. In the example illustrated in FIGS. 6 and 7, the deep cutout portions 7C and 7D that are each deeper than the fluid tube arrangement cutout portions 7A and 7B are formed in the curved portions of the portions 7A and 7B in the tube passage portion of the fluid tube embedding groove. In the deep cutout portion 7C, a fluid tube retainer 7E attached to the surface of the fluid tube is fitted at a position in the vicinity of the curved portion of the fluid tube. Also, as shown in FIG. 7, it is preferable that this fluid tube retainer 7E is fitted so as to cover the fluid tube from above thereby to prevent protrusion of the fluid tube with more reliability, but there occurs no problem even if the covering angle is shifted to some extent. FIG. 8 is a schematic vertical side view under a state where the heat radiation board is in the course of being folded using the back surface material as a hinge, while FIG. 9 is a schematic vertical side view of a state where folding from the state shown in FIG. 8 is finished.

When folding portions of the heat radiation board are formed only in the end portions in the widthwise direction of the plate-like members or only in the end portions in the lengthwise direction thereof, mountain foldable portions and valley-foldable portions are alternately arranged. When the folding portions are arranged at both of the end portions in the widthwise direction of the plate-like members and the end portions in the lengthwise direction thereof, both of the heat radiation sheet and the back surface material are made discontinuous at some of the plurality of folding portions in accordance with the number of plate-like members constituting the heat radiation board, as shown in the schematic plan views in FIGS. 10 to 13. In FIGS. 10 to 13, the fluid tubes are omitted; reference numeral 11 denotes each folding portion at which the board is folded in a mountain (protrusion) shape, and reference numeral 12 represents each folding portion at which the board is folded in a valley (recess) shape. Also, a portion 10 specified by a bold line represents a folding portion at which both of the heat radiation sheet and the back surface material are made discontinuous, with both of the mountain folding and the valley folding being possible at this bold line portion 10. Further, the discontinuous portions in these drawings are merely examples, and the present invention is not limited to these illustrated examples. For instance, it is possible to provide the discontinuous portions at arbitrary folding portions.

The present invention, described in detail above, provides the following especially advantageous effects and has an extremely high industrial utility value.

1. The foldable heat radiation board according to the present invention is formed by a single integrated member obtained by embedding continuous fluid tubes in a plurality of plate-like members, attaching a heat radiation sheet to the front surface side, and attaching a back surface material to the back surface side. Thus, the number of construction elements is reduced and there is facilitated the handling at the time of manufacturing, packaging, storage, transportation, and installation.
2. The foldable heat radiation board according to the present invention has a structure in which a fluid tube outlet opening portion in an end portion of one of adjacent plate-like members and a fluid tube inlet opening portion in an end portion of the other of the adjacent plate-like members are set at positions at which the opening portions do not oppose each other but are shifted (offset) from each other. A fluid tube arrangement cutout portion is provided between the opening portions on wall surfaces in the end portions of the adjacent plate-like members, and a fluid tube is allowed to extend from the outlet opening portion to the inlet opening portion through the fluid tube arrangement cutout portion (i.e., the fluid tube extends along the folding portion), so that when the heat radiation board is folded at the folding portion, the fluid tube is not buckled.
3. The foldable heat radiation board according to the present invention has a structure in which the plurality of plate-like members are integrated with each other by a heat radiation sheet and a back surface material, but at least one of the heat radiation sheet or the back surface material is made discontinuous along the plurality of folding portions. Thus, when the heat radiation board is folded at the folding portions, the discontinuous portions function as a hinge and there is prevented a situation where the plurality of plate-like members constituting the heat radiation board are disassembled.
4. The foldable heat radiation board according to the present invention is capable of being folded smoothly even when the plurality of plate-like members are arranged to form two rows (or two columns) because both the heat radiation sheet and the back surface material are made discontinuous at some of the plurality of folding portions.
5. A deep cutout portion that is deeper than the fluid tube arrangement cutout portion is provided so as to be adjacent to the inlet opening portion and the outlet opening portion respectively of the fluid tube arrangement cutout portion. A fluid tube retainer, whose sectional configuration taken perpendicular to a lengthwise direction is a short C-shaped tube, is attached at a position corresponding to the deep cutout portion on the fluid tube extending through the fluid tube arrangement cutout portion. Thus, when the heat radiation board is installed by unfolding the board, the surface thereof is finished with levelness and the floor having the decorative material arranged thereon is level, since the fluid tube retainer retains the fluid tube in the fluid tube arrangement cutout portion.
6. When an entire surface of the heat radiation sheet or the vicinity of the heat radiation sheet folding portions is formed by using a hard plate-like material, it is possible to accurately retain the fluid tube in the fluid tube arrangement cutout portion by strongly depressing the fluid tube retainer.

INDUSTRIAL APPLICABILITY

The foldable heat radiation board of the present invention is usable as a heating apparatus to be installed on the surface of a base material of a building, such as an ordinary housing, condominium, or a commercial building, or to be applied to a wall surface, a ceiling board, a screen, or the like in a residential space.

What is claimed is:

1. A foldable heat radiation board comprising:
   a plurality of elongated plate members each having a front surface, a back surface, and fluid tube embedding grooves in one of said front surface and said back surface, said plate members being arranged in a substantially quadrangular plan configuration so that adjacent sides of adjacent plate members contact each other;
   fluid tubes embedded in said embedding grooves;
   a heat radiation sheet attached to an entirety of said front surface;
   a back surface material attached to at least a portion of said back surface; and
   a plurality of folding portions formed along said adjacent sides of said adjacent plate members, each of said folding portions having a fluid tube outlet portion in a side of a first one of said adjacent plate members, having a fluid tube inlet portion in a side of a second one of said adjacent plate members, and having a fluid tube cutout portion connecting said fluid tube inlet portion and said fluid tube outlet portion, said fluid tube outlet portion and said fluid tube inlet portion being arranged so as to be offset from each other and thereby not directly oppose each other;
   wherein a portion of one of said fluid tubes is arranged in each of said folding portions so as to extend substantially parallel to said adjacent sides of said adjacent plate members from said fluid tube inlet portion to said fluid tube outlet portion through said fluid tube cutout portion; and
   wherein at least one of said heat radiation sheet and said back surface material is discontinuous along each of said plurality of folding portions.

2. The foldable heat radiation board of claim 1, wherein said plurality of folding portions are arranged along widthwise sides and/or lengthwise sides of said plate members.

3. The foldable heat radiation board of claim 1, wherein each of said folding portions further has a pair of deep cutout portions that are each deeper than said fluid tube cutout portion, one of said pair of deep cutout portions is arranged at each of said fluid tube inlet portion and said fluid tube outlet portion; and said foldable heat radiation board further comprises fluid tube retainers each attached to one of said fluid tubes at a position corresponding to one of said deep cutout portions of each of said folding portions, each of said fluid tube retainers having a C-shaped sectional configuration perpendicular to a lengthwise direction of said one of said fluid tubes.

4. The foldable heat radiation board of claim 1, wherein a mountain-foldable structure comprises at least parts of said heat radiation sheet at said plurality of folding portions formed of a hard plate material, said back surface material on said back surface of said heat radiation board being continuous at said plurality of folding portions, and said heat radiation sheet on said front surface being discontinuous at said plurality of folding portions.

5. The foldable heat radiation board of claim 1, wherein both said heat radiation sheet and said back surface material are discontinuous at some of said folding portions.

6. The foldable heat radiation board of claim 1, wherein said fluid tube inlet portion of each of said folding portions communicates with one of said fluid tube embedding grooves in said second one of said adjacent plate members, and said fluid tube outlet portion of each of said folding portions communicates with one of said fluid tube embedding grooves in said first one of said adjacent plate members.

* * * * *